United States Patent [19]

Lewis

[11] 4,186,875
[45] Feb. 5, 1980

[54] TWO-TEMPERATURE PNEUMATIC THERMOSTAT CONTROL SYSTEM AND UNIT THEREFOR

[75] Inventor: Jay L. Lewis, Knoxville, Tenn.

[73] Assignee: Robertshaw Controls Company, Richmond, Va.

[21] Appl. No.: 888,500

[22] Filed: Mar. 20, 1978

[51] Int. Cl.² .......................................... G05D 23/00
[52] U.S. Cl. ........................................ 236/47; 236/87
[58] Field of Search .............................. 236/47, 82, 87

[56] References Cited

U.S. PATENT DOCUMENTS

| 3,212,710 | 10/1965 | Nilles | 236/47 |
| 3,902,663 | 9/1975 | Elmer | 236/87 |

Primary Examiner—William E. Wayner
Attorney, Agent, or Firm—Candor, Candor & Tassone

[57] ABSTRACT

A two-temperature pneumatic thermostat control system having an output device, a two-level source of pneumatic pressure, a first temperature sensor for controlling the flow of pneumatic fluid from the source to the device when the source is at a first level thereof, a second temperature sensor for controlling the flow of pneumatic fluid from the source to the device when the source is at a second level thereof, a switching unit for automatically switching the device to be controlled by the first sensor when the source is at the first level thereof and by the second sensor when the source is at the second level thereof, and a manual reset member for causing the switching unit to switch the device to be controlled by the first sensor even though the source is at the second level thereof when the reset member is moved to a reset position thereof. The reset member includes a pivotally mounted lever having a pneumatic part for acting on one end thereof and a valve unit at the other end thereof to be controlled thereby. The valve unit comprises a close-before-open valve unit that is operatively interconnected to the other end of the lever of the reset member and the switching unit to be controlled by the reset member to cause the switching unit to switch the device to be controlled by the first sensor even though the source is at the second level thereof when the reset member is moved to the reset position thereof.

10 Claims, 4 Drawing Figures

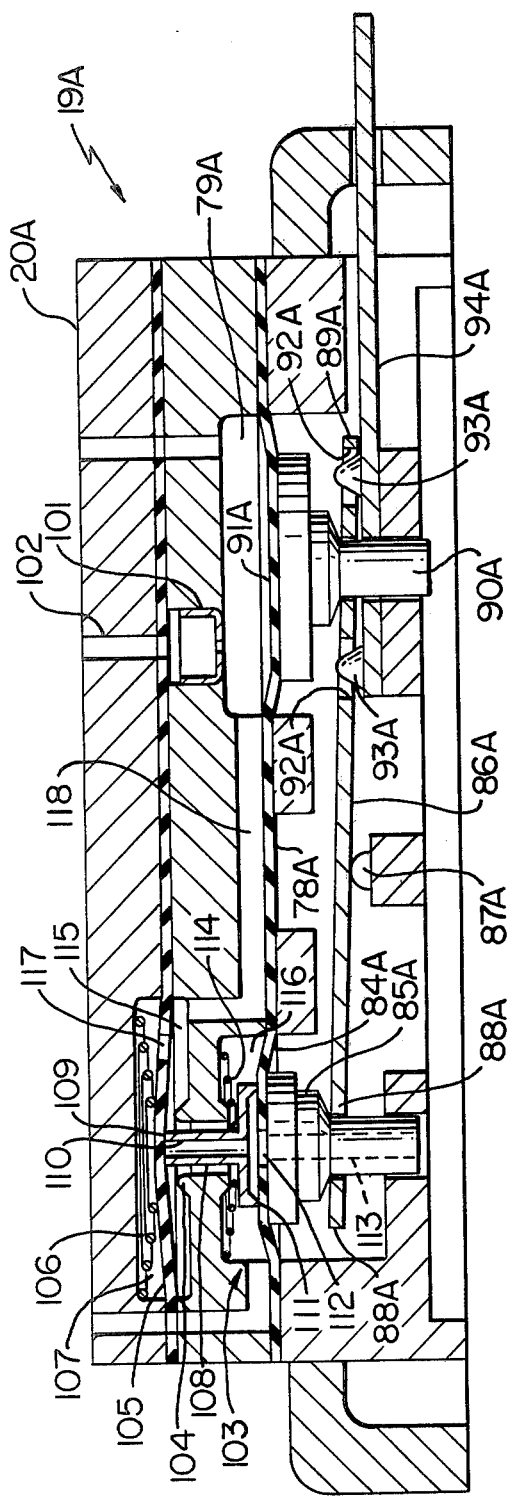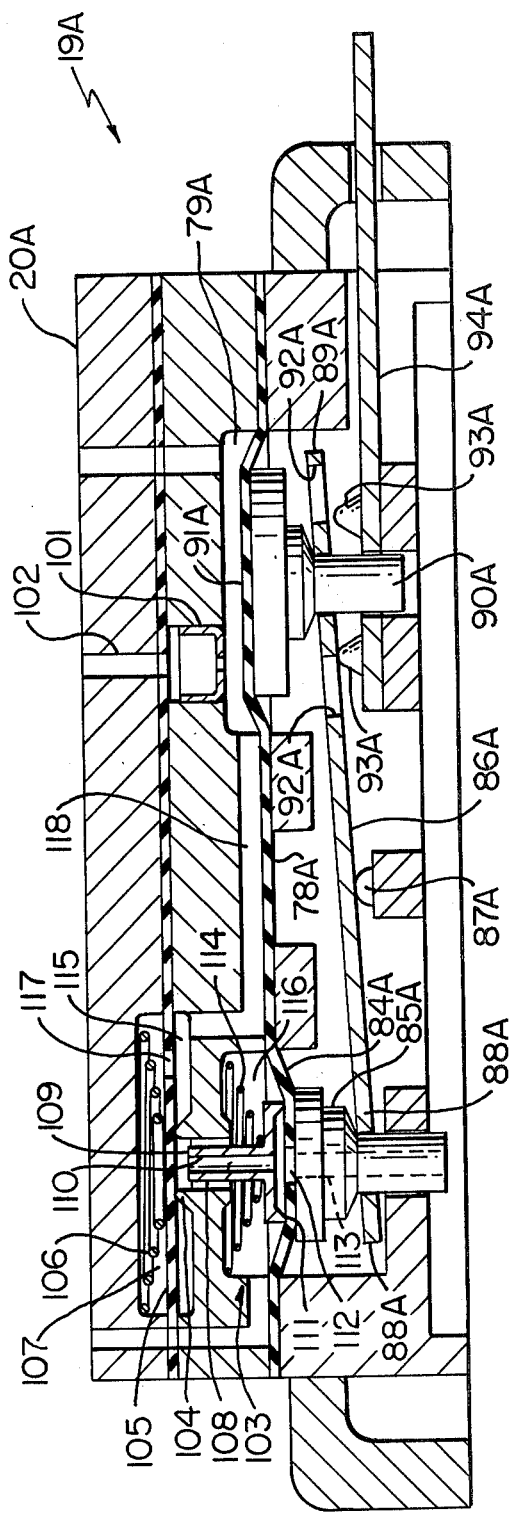

TWO-TEMPERATURE PNEUMATIC THERMOSTAT CONTROL SYSTEM AND UNIT THEREFOR

BACKGROUND OF THE INVENTION

1. Field of the Invention

This invention relates to a two-temperature pneumatic thermostat control system as well as to a two-temperature pneumatic thermostat control unit for such a system or the like.

2. Description of the Prior Art

It is known to provide a two-temperature pneumatic thermostat control system having an output device, a two level source of pneumatic pressure, a first temperature sensor for controlling the flow of pneumatic fluid from the source to the device when the source is at a first level thereof, a second temperature sensor for controlling the flow of pneumatic fluid from the source to the device when the source is at a second level thereof, a switching means for automatically switching the device to be controlled by the first sensor when the source is at the first level thereof and by the second sensor when the source is at a second level thereof, and manual reset means for causing the switching means to switch the device to be controlled by the first sensor even though the source is at the second level thereof when the reset means is moved to a reset position thereof.

For example, see the following item:

(1) See the control system and unit labeled as prior art in FIG. 1 of this application.

It can be seen that the reset lever of the system and unit of item (1) above operates a single valve member which can either move to an open or a closed position so that an orifice is required in the system to prevent a dumping of the source vacuum when the reset lever is utilized to move the valve member to a vent position thereof.

SUMMARY OF THE INVENTION

It is known to provide a two-temperature pneumatic thermostat control system that will permit one temperature sensor to operate the system to tend to maintain the output effect of a heat exchanger means at the selected temperature of the temperature sensor when the level of a two level source of pneumatic pressure is at one level thereof, such as a low pressure level for daytime operation of the control system. However, when nighttime comes, the pressure source is caused to have a higher pressure level which will cause the system to automatically switch the same to another temperature sensor which will tend to maintain the output temperature effect of the heat exchange means at the selected temperature setting of the second temperature sensor which could be a reduced temperature for the nighttime operation.

Thereafter, when daytime arrives, the pressure source is changed to produce its lower level of pressure and the system will automatically change back to its daytime operation utilizing the first temperature sensor for controlling the output temperature effect of the heat exchanger.

However, such system is provided with a manual reset means to cause the system to be switched back to utilizing the daytime temperature sensor even though the pressure level of the pneumatic source is at the high level thereof that normally would require the nighttime temperature sensor to be operated. This permits a nighttime operation of the system at the daytime temperature setting thereof, if desired.

It was found, according to the teachings of this invention, that such a system could be improved by providing a single orifice between the pneumatically operated device of the system and the pneumatic source thereof in such a manner that the single orifice is adapted to be used by either of the temperature sensors to control the flow of pneumatic fluid to the pneumatically operated device whereas the previously described prior known control system requires a pair of orifices respectively for the pair of temperature sensors.

It was also found, according to the teachings of this invention, that the aforementioned control system could be provided with a close-before-open valve means operatively interconnected to the reset means to cause the switching means to switch the pneumatically operated device to be controlled by the daytime sensor even though the pneumatic source is at the pressure level thereof that would normally require the nighttime sensor to be operating, such close-before-open valve means permitting an orifice of the aforementioned prior known system to be eliminated and thereby reducing the maximum air consumption of the system as will be apparent hereinafter.

In particular, one embodiment of this invention provides a two-temperature pneumatic thermostat control system having an output device, a two level source of penumatic pressure, a first temperature sensor for controlling the flow of pneumatic fluid from the source to the device when the source is at a first level thereof, a second temperature sensor for controlling the flow of pneumatic fluid from the source to the device when the source is at a second level thereof, a switching means for automatically switching the device to be controlled by the first sensor when the source is at the first level thereof and by the second sensor when the source is at the second level thereof, and manual reset means for causing the switching means to switch the device to be controlled by the first sensor even though the source is at the second level thereof when the reset means is moved to a reset position thereof. The reset means includes a pivotally mounted lever having pneumatic means for acting on one end thereof and valve means at the other end thereof to be controlled thereby. The valve means comprises a close-before-open valve means that is operatively interconnected to the other end of the lever of the reset means and to the switching means to be controlled by the reset means to cause the switching means to switch the device to be controlled by the first sensor even though the source is at the second level thereof when the reset means is moved to the reset position thereof.

Accordingly, it is an object of this invention to provide an improved two-temperature pneumatic thermostat control system having one or more of the novel features of this invention as set forth above or hereinafter shown or described.

Another object of this invention is to provide an improved two-temperature pneumatic thermostat control unit having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWING

FIG. 3 is an enlarged view of a part of the control unit of FIG. 2 and illustrates the same when the control unit has been automatically changed by the high pressure level of the pneumatic source.

FIG. 4 is a view similar to FIG. 3 and illustrates the reset means of the control unit having been moved to the reset position thereof.

DESCRIPTION OF THE PREFERRED EMBODIMENT

Figure 1:
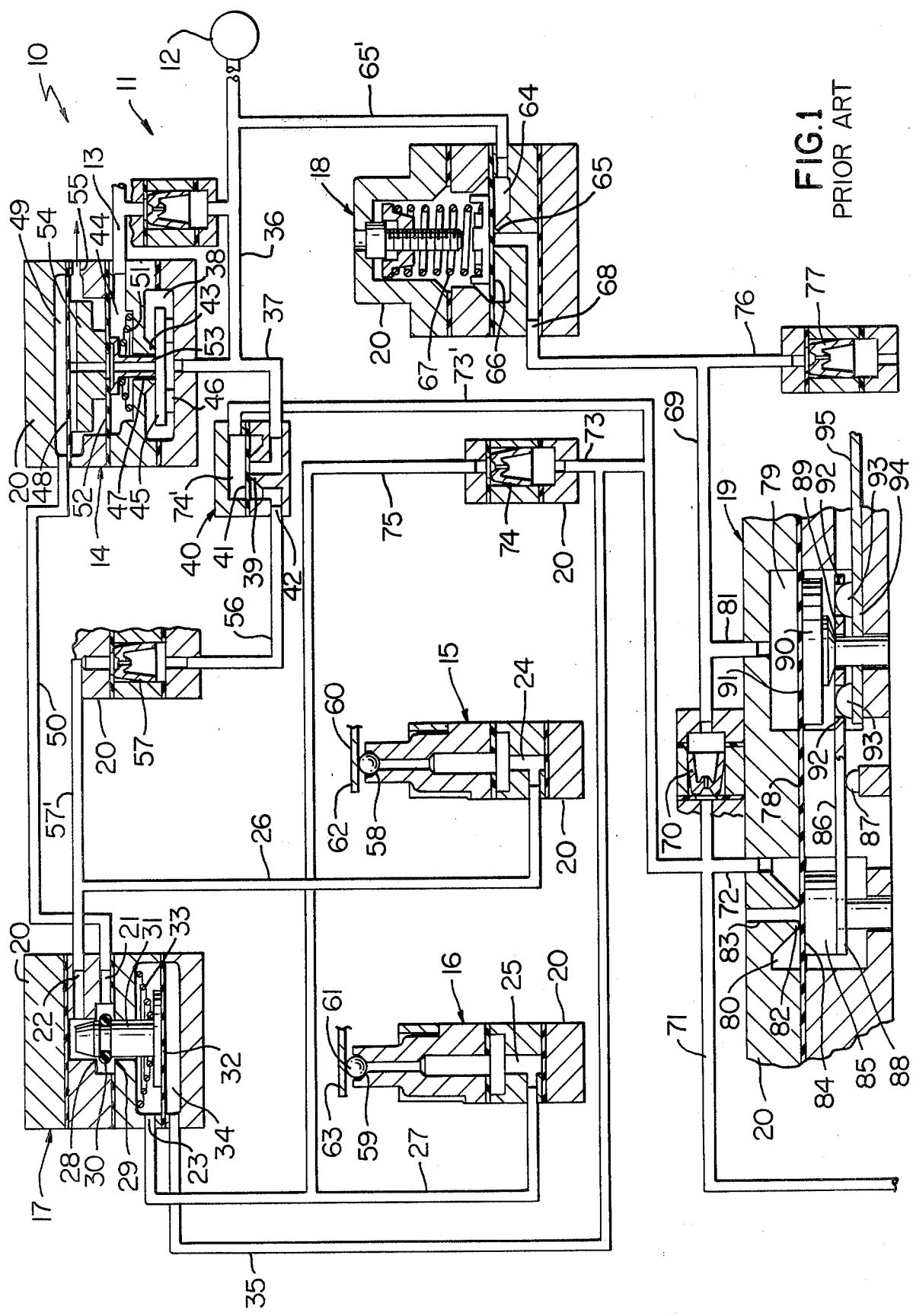
FIG. 1 is a schematic view illustrating a prior art two-temperature pneumatic thermostat control system and control unit therefor.

While the various features of this invention are hereinafter described and illustrated as being particularly adapted to provide a daytime and nighttime two-temperature pneumatic thermostat control system and unit therefor, it is to be understood that the various features of this invention can be utilized singly or in any combination thereof to provide a control system and unit for other controlling purposes as desired.

Therefore, this invention is not to be limited to only the embodiment illustrated in the drawings, because the drawings are merely utilized to illustrate one of the wide varieties of uses of this invention.

In order to understand the features of this invention, it is believed best to fully describe the prior art two-temperature pneumatic thermostat control system and unit that are illustrated in FIG. 1 and are respectively indicated generally by the reference numerals 10 and 11, the control unit 11 either being a single, self-contained package of devices or a plurality of single devices merely interconnected together by conduit means as schematically illustrated.

In any event, it can be seen in FIG. 1 that the control system 10 comprises a pneumatic source 12 that is adapted to have two different pressure levels, such as a low pressure level of approximately 17 psi and a high pressure level of approximately 21 psi in a manner conventional in the art whereby an output conduit 13 of an output device 14 is adapted to direct pneumatic pressure from the source 12 in a manner hereinafter described to a pneumatically operated heat exchange unit (not shown) to control the same so that the heat exchange unit will have its output temperature effect controlled by the temperature setting of a first temperature sensing unit 15 when the pressure level of the source 12 is at the low level thereof and will have the output temperature effect thereof controlled by a second temperature sensing unit 16 when the level of the pressure source 12 is at the high level thereof as will be apparent hereinafter.

The system 10 includes a switching device 17, a pneumatically operated valve means 18 and a manually operated reset means 19.

Each of the devices 14–19 includes a housing means that can be the same or separate from the other housing means and therefor the housing means for each of the devices 14–19 will be indicated by the same reference numeral 20.

The switching device 17 has the housing means 20 thereof provided with an inlet 21 and a pair of outlets 22 and 23 respectively being adapted to be interconnected to chambers 24 and 25 in the housing means 20 of the temperature sensing devices 15 and 16 by conduit or passage defining means 26 and 27, the two outlets 22 and 23 of the switching device 17 being separated respectively from the inlet 21 by a pair of valve seats 28 and 29 respectively controlled by a movable resilient valve member 30 carried on a plunger 31 that is operatively interconnected to a flexible diaphragm 32 that is normally urged downwardly in FIG. 1 by a compression spring 33 so as to have the valve member 30 close the valve seat 29 to normally tend to interconnect the inlet 21 with the outlet 22 and prevent the outlet 23 from being interconnected to the inlet 21.

However, a chamber 34 is provided in the housing means 20 of the switching device 17 so as to be adapted to receive pressure fluid from a conduit means 35 in a manner hereinafter described. Thus, when the chamber 34 is pressurized so that the resulting pressure differential acting across the diaphragm 32 is sufficient to overcome the force of the compression spring 33 and move the diaphragm 32, the valve member 30 is moved away from the valve seat 29 to close the valve seat 28 and thereby disconnect the inlet 21 from the outlet 22 and interconnect the inlet 21 to the outlet 23 for a purpose hereinafter described.

The pneumatic source 12 is interconnected to a conduit means 36 which, in turn, is interconnected to a branch conduit means 37 that leads to a chamber 38 in the housing means 20 of the pneumatically operated device 14 as well as to a valve seat 39 of a pneumatically operated valve unit 40 that has a flexible diaphragm 41 for opening and closing the valve seat 39 from an outlet 42 of the valve unit 40 for a purpose hereinafter described.

The chamber 38 of the pneumatically operated device 14 is adapted to be interconnected by a stationary valve seat 43 in the housing means 20 of the device 14 to an output or branch chamber 44 thereof that is interconnected to the output conduit 19 that leads to the pneumatically operated heat exchange means previously described. A resilient valve member 45 is disposed in the chamber 38 of the pneumatically operated device 14 and against upwardly extending projections 46 to cause the same to bow into a closed condition against the valve seat 43 but being adapted to be moved away from the valve seat 43 by a tubular valve member 47 that projects through the valve seat 43 to engage against the valve member 45 and be under the control of a flexible diaphragm 48 of the device 40.

In particular, the flexible diaphragm 48 cooperates with the housing means 20 of the device 14 to define a chamber 49 that is interconnected by a conduit or passage defining means 50 to the inlet 21 of the switching device 17 so that when the pneumatic fluid being directed to the chamber 49 in a manner hereinafter described is adapted to cause a pressure differential acting across the diaphragm 48 that is greater than the force of a compression spring 51 that opposes downward movement of the diaphragm 48, the diaphragm 48 will move downwardly and thereby move the tubular valve member 47 downwardly therewith to bow the central part of the valve member 45 away from the valve seat 43 and permit supply pressure in the chamber 38 to flow through the now open valve seat 43 into the output chamber 44 to be directed to the heat exchanger means to operate the same in a manner hereinafter described.

Conversely, should the output pressure in the chamber 44 that is acting upon a feedback diaphragm 52 thereof exceeds a certain value so that the sum of the pressure differential acting across the diaphragm 52 and the force of the compression spring 51 is greater than the pressure differential acting across the diaphragm 48, the diaphragms 52 and 48 as well as the tubular valve member 47 will move upwardly from the position illustrated in the drawings to open the end 53 of the tubular valve member 47 away from the valve member 45 so that the pressure in the output chamber 44 can bleed through the open end 53 of the tubular valve member 47 and through cooperating passage means in the diaphragm 52 and a spacer means 54 to the atmosphere through a vent opening 55. In this manner, the output pressure is the output chamber 44 of the device 14 will be maintained at a certain level thereof depending upon the pressure level in the pilot chamber 49 thereof in a manner well known in the art. For example, see the U.S. patent to Puster et al, U.S. Pat. No. 3,819,113 for a further description of the structure and operation of devices similar to the devices 14, 15, 16, 17 and 18, if such additional information is desired.

The outlet 42 of the valve unit 40 is interconnected by a conduit or passage defining means 56 to an orifice 57 of the unit 11 that interconnects the conduit 56 to a conduit or passage defining means 57' at a controlled rate, the conduit 57' being interconnected to the outlet 22 of the switching device 17 as well as to the conduit 26 that leads to the chamber 24 of the temperature sensing device 15.

The temperature sensing devices 15 and 16 respectively have their chamber 24 and 25 leading to bleed valve seats 58 and 59 respectively controlled by ball valve members 60 and 61 that are urged toward their respective valve seats 58 and 59 by bimetal temperature sensing members 62 and 63 in a manner well known in the art so that the respective temperature sensor 15 or 16 will tend to maintain the pressure value of the pressure fluid in the chamber 24 or 25 thereof at a certain pressure value that is proportional to the temperature being sensed by the particular bimetal member 62 or 63 for the particular temperature setting of that bimetal member 62 or 63.

For example, the temperature sensing device 15 can be set to tend to maintain an output temperature effect of the heat exchange unit of approximately 70° F. whereas the temperature sensing device 16 can be set to tend to maintain the output temperature effect of approximately 60° F. because the temperature sensing member 16 is to tend to maintain the output temperature effect thereof for a nighttime operation as will be apparent hereinafter.

The valve unit 18 has a chamber 64 thereof interconnected by a conduit or passage defining means 65' to the pressure source conduit 36, the chamber 64 leading to a fixed valve seat 55 of the housing means 20 of the device 18 that is opened and closed by a flexible diaphragm 66 normally urged to a closed position by a compression spring 67.

The force of the compression spring 67 is so selected that the force of the pressure fluid in the chamber 64 of the device 18 is insufficient to open the valve member 66 away from the valve seat 65 in opposition to the force of the compression spring 67 when the pressure source 12 is at the low level thereof. However, when the pressure source 12 is delivering fluid pressure at the high level thereof, such pressure force in the chamber 64 of the device 18 is sufficient to overcome the force of the compression spring 67 and thereby move the diaphragm 66 away from the valve seat 65 to interconnect the chamber 64 to an outlet 68 of the device 18 that is interconnected to a conduit or passage defining means 69 as illustrated.

The conduit or passage means 69 leads to an orifice 70 that interconnects the conduit 69 with the conduit 35 as well as to branch conduits 71 and 72.

Thus, it can be seen that the orifice 70 will supply the high level fluid pressure from the source 12 once the device 18 is open in the manner previously described at a controlled rate to the chamber 34 of the switching device 17 to cause the device 17 to switch the valve member 30 thereof away from the valve seat 29 to open the valve seat 29 and to close the valve seat 28 and thereby interconnect the conduit 27 to the conduit 50 for a purpose hereinafter described.

The conduit 35 is interconnected by a branch conduit 73 to an orifice 74 that is interconnected by a conduit or passage defining means 75 to the conduit 27 intermediate the sensor 16 and the switching device 17 whereby the orifice 74 is adapted to interconnect the source 12, when the same is at the high level thereof, at a controlled rate to the valve seat 29 of the switching device 17 and, thus, to the pilot chamber 49 of the device 14 under the control of sensor 16 in a manner hereinafter set forth.

The conduit 35 is also interconnected by a branch conduit or passage defining means 73' to a chamber 74' of the valve unit 40 for a purpose hereinafter described.

The conduit 69 that leads from the valve unit 18 is interconnected by a branch conduit or passage defining means 76 to an orifice 77 that leads to the atmosphere or vent so that the conduit 69 can bleed down to atmospheric pressure when the valve means 18 is subsequently moved to a closed position by the pressure source 12 returning from the high level thereof to the low level thereof as will be apparent hereinafter.

The reset means 19 includes a flexible diaphragm 78 that cooperates with the housing means 20 to define a pressure chamber 79 and a second chamber 80, the chamber 79 being interconnected connected by a branch conduit or passage means 81 to the conduit 69 while the chamber 80 is adapted to be interconnected by a fixed valve seat 82 to a vent passage 83.

The fixed valve seat 82 is adapted to be opened and closed by a portion 84 of the diaphragm 78 depending upon the position of a backup plunger 85 that is adapted to be held against the diaphragm 84 to close the valve seat 82 by a pivotally mounted lever 86 that pivots on a pivot point 87 of the housing means 20 and has the end 88 thereof bearing against the plunger 85, the other end 89 of the lever 86 bearing against another plunger 90 that is disposed against a portion 91 of the diaphragm 78 that defines the chamber 79 as illustrated.

The end 89 of the lever 86 has a plurality of openings 92 passing therethrough and adapted to respectively receive abutments 93 of a reset lever 94 rotatably mounted to the housing means 20 by the plunger 90 as illustrated whereby a free end 95 of the reset lever 94 can be grasped to rotate the lever 94 and thereby cause the camming abutments 93 to cam out of the openings 92 and cam against the end 89 of the lever 86 to cause the same to pivot in a counterclockwise direction about the pivot point 87 and thereby permit the valve member 84 to open the valve seat 82 and thereby vent the chamber 80 to the atmosphere for a purpose that will be apparent hereinafter.

The operation of the prior art control system 10 and control unit 11 therefore will not be described.

Assuming that the pressure source 12 is supplying its low level pressure to the conduit 36 for daytime operation, the valve member 65 of the valve unit 18 is held closed against the valve seat 65 whereby the pressure source conduit 36 is not interconnected to the chamber 34 of the switching device 17 through the conduit 69, orifice 70 and conduit 35 whereby the action of the temperature sensing device 16 for nighttime operation does not have any influence upon the control system as the valve seat 29 of the switching device 17 is held closed by the valve member 30 being urged downwardly by the compression spring 33.

However, the low level pressure in the conduit 36 opens the valve member 41 away from the valve seat 39 to interconnect the pressure source 12 through the orifice 57 and conduit 57' to the outlet 22 of the switching device 17 and, thus, through the opened valve seat 28 to the inlet 21 that leads by the conduit 50 to the pilot chamber 49 of the device 14 to tend to move the diaphragm stack 48, 54, 52 and 47 downwardly to open the valve member 45 away from the valve seat 43 to interconnect the pressure source 12 to the branch chamber or output chamber 44 and, thus, to the heat exchanger device, the valve member 41 of the unit 40 opens because the chamber 74' thereof is interconnected to vent through conduit 73', conduit 35, conduit 72 and open valve seat 82 to vent passage 83.

The bimetal members 62 of the sensor 15 is sensing the output temperature effect of the heat exchanger means so that should the output temperature effect thereof be above the selected temperature of the sensor 15, the bimetal member 62 moves upwardly to the drawings to permit the fluid pressure being directed to chamber 24 thereof from the orifice 57 to be bled to the atmosphere at a rate that will cause the pressure in the pilot chamber 49 of the device 14 to be so reduced so that the compression spring 51 can move the tubular valve member 47 upwardly to open the end 53 thereof from the valve member 45 and permit the pressure in the branch chamber 44 to bleed down to thereby cause the heat exchanger to reduce the output temperature effect thereof to one that would produce the desired temperature of the setting of the device 15.

Conversely, should the output temperature effect of the heat exchanger means fall below the temperature setting of the sensor 15, the bimetal member 62 moves downwardly in the drawings to decrease the amount of bleed of the pressure fluid in the chamber 24 thereof to atmosphere so that the pressure in the pilot chamber 49 can build up to such a value that the same will overcome the force of the compression spring 51 and thereby move the tubular valve member 47 downwardly to open the central portion of the valve member 45 away from the valve seat 43 to increase the amount of fluid pressure being directed into the output chamber 44 of the device 14. This increase in pressure being directed by the conduit 13 from the output chamber 44 of the device 14 causes the heat exchanger means to increase its output temperature effect to tend to reach the selected temperature of the sensor 15.

In this manner, the sensor 15 controls the pressure of the pressure fluid being directed to the pilot chamber 49 of the device 14 that flows from the supply 12 through the orifice 57 in relation to the temperature being sensed by the sensor 15.

When the system 10 changes over to the nighttime operation thereof, the pressure source 12 increases its output pressure to the higher pressure level thereof which causes the pressure in the chamber 64 to increase to the point of opening the valve member 66 away from the valve seat 65 in opposition to the force of the compression spring 67 and thereby permit the pressure source 12 to be interconnected through the orifice 70 to the conduit 35 and, thus, to the chamber 34 of the switching device 17. This pressure in the chamber 34 of the switching device 17 moves the diaphragm 32 upwardly to cause the valve member 30 to open the valve seat 29 and close the valve seat 28, the closing of the valve seat 28 disconnecting the orifice 57 and sensor 15 from the pilot chamber 49 of the device 14 while interconnecting the orifice 74 and sensor 16 to the now open valve seat 29 to the pilot chamber 49 of the device 14.

The fluid pressure now in the conduit 35 also enters therefrom into the branch conduit 73' to the chamber 74' of the valve unit 40 to close the valve member 41 against the valve seat 39 whereby the pressure source conduit 36 is now isolated from the temperature sensor 15.

In addition, the pressure source 12 now being interconnected to the conduit 69 is interconnected by the branch conduit 81 to the chamber 79 of the reset device 19 so that the pressure acting on the diaphragm 91 urges the plunger 90 downwardly to act on the end 89 of the lever 86 and cause the same to tend to pivot in a clockwise direction so that the end 88 of the lever 86 maintains the plunger 85 and diaphragm portion 84 in a position to positively close the valve seat 82 whereby the pressure fluid entering the conduit 35 from the orifice 70 will not be interconnected to the vent 83.

The pressure fluid that is now directed into the conduit 35 through the orifice 70 passes from the branch conduit 73 through the orifice 74 into the conduit 27 that leads respectively to the open valve seat 29 of the switching device 17 and the chamber 25 of the sensing device 16.

In this manner, the sensing device 16 will control the operation of the heat exchanger means in the same manner as the sensor 15 except that the sensor 16 has been set for a different temperature, such as a lower temperature setting because of the nighttime operation of the system 10.

In particular, the sensing of a temperature above the selected temperature of the sensor 16 will cause the sensor 16 to vent a greater quantity of the pressure fluid to the atmosphere to decrease the pressure in the pilot chamber 49 to cause the branch pressure 44 to decrease in the manner previously described.

Conversely, a sensing of an output temperature effect below the setting of the device 16 will cause the bimetal member 63 to decrease the amount of bleed to atmosphere so that the pressure fluid in the pilot chamber 49 will increase to increase the output pressure in the output chamber 44 in the manner previously described in regards to the sensor 15.

Therefore, it can be seen that during the nighttime operation of the system 10, the sensor 16 will control the output temperature effect of the heat exchanger means as long as the pressure level of the source 12 is at the high pressure level thereof.

The system 10 will automatically revert back to daytime operation thereof when the output pressure of the source 12 drops to the low level thereof because the switching device 18 will close and thereby prevent further interconnection of the source 12 into the conduit 69 which will vent through the orifice 77. Once the conduit 69 vents down, the pressure in the chamber 34 of the switching device 17 likewise vents down so that the compression spring 33 will move the valve member 30 downwardly to close the valve seat 29 and open the valve seat 28 so that the pneumatically operated relay 14 will be under the control of the sensor 15 and not the sensor 16, the valve member 41 of the valve unit 40 opening as the pressure in the chamber 74' is now vented.

If during the nighttime operation of the system 10 wherein the source 12 is producing the high pressure level thereof, it is desired that the heat exchanger means be operating as though the same was operating under daytime operation thereof and there is no way to change the output level of the source 12, the reset lever 94 can be moved to a reset position thereof wherein the same is rotated to cause the cam abutments 93 to cam out of the openings 92 and cam against the end 89 of the lever 86 to cause the lever 86 to pivot in a counterclockwise direction so that the end 88 thereof moves downwardly and permits the valve seat 82 to be opened. This opening of the valve seat 82 causes the fluid pressure being directed from the source 12 through the orifice 70 to be dumped to the vent 83 and this venting of the fluid pressure likewise dumps the fluid pressure in the conduit 35 and chamber 34 of the switching device 17 so that the force of the compression spring 33 moves the valve member 30 downwardly to close the valve seat 29 and open the valve seat 28. In this manner, the sensor 16 is disconnected from control of the relay 14 and the sensor 15 is now interconnected to control the relay 14 in a manner previously described even though the pressure source 12 is producing the high level pressure thereof, the valve member 41 of the valve unit 40 being opened as its chamber 74' thereof is now also interconnected to vent.

In order to terminate the reset operation, the lever 94 is rotated back into the position illustrated in FIG. 1 so that the end 89 of the lever can move downwardly in a clockwise direction under the force of the fluid pressure in the chamber 79 to again close the seat 82 and thereby prevent the dumping of the pressure from the orifice 70 to vent so that the pressure can again build up in the switching device 17 to switch the same back to the nighttime operation in the manner previously described.

As previously stated, one of the features of this invention is to eliminate the requirement of having the two separate orifices 57 and 74 of the prior art system 10 and unit 11 being respectively required for the temperature sensors 15 and 16 and replace the same with a single orifice.

Further, it is another feature of this invention to replace the valve means 82, 84 of the reset device 19 of the system 10 and unit 11 with a close-before-open valve means whereby the orifice 70 can be eliminated and a reduction will be made in a maximum air consumption of the system.

Figure 2:
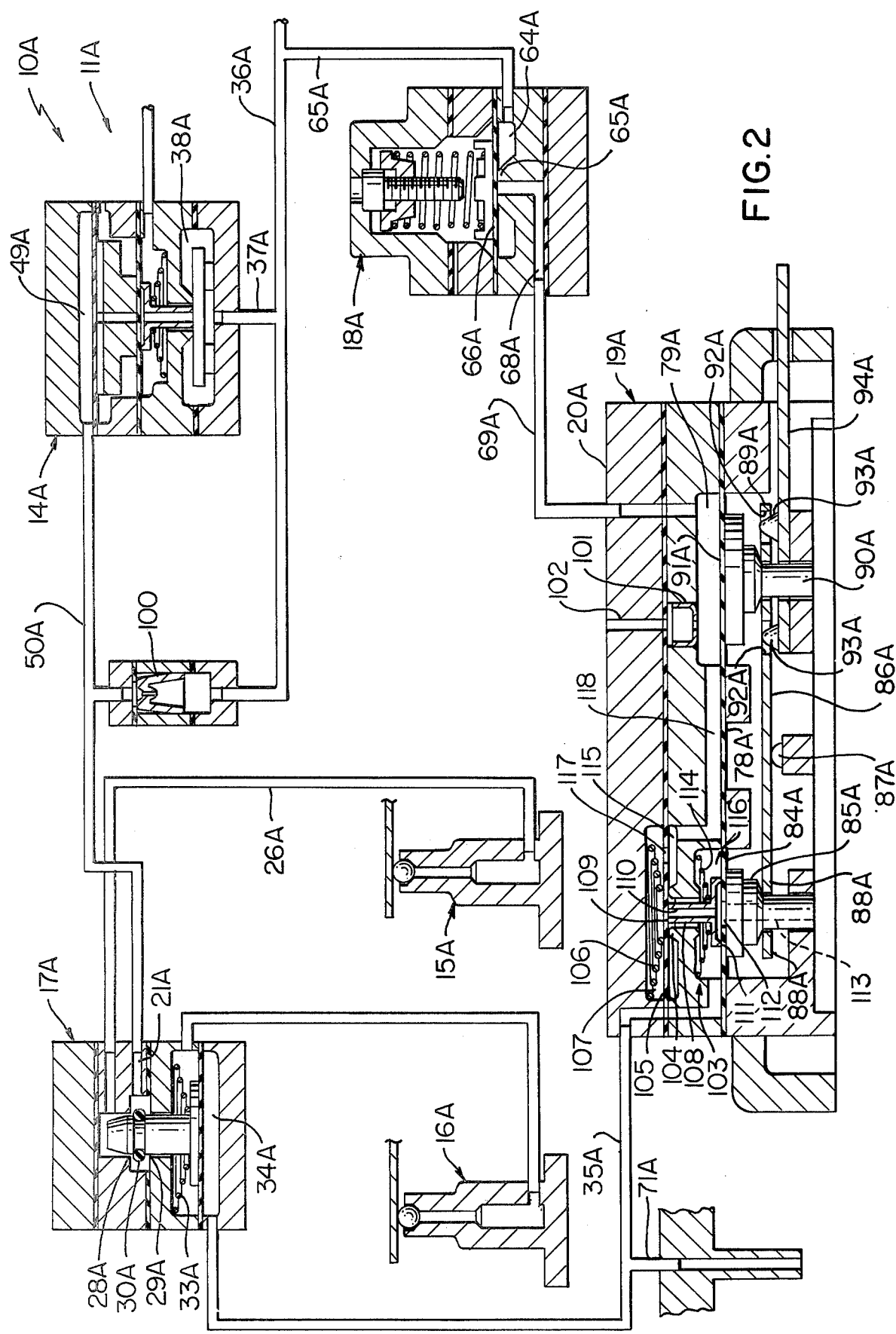
FIG. 2 is a view similar to FIG. 1 and illustrates the improved two-temperature pneumatic thermostat control system of this invention utilizing the two-temperature pneumatic thermostat control unit of this invention.

In particular, such an improved and control unit of this invention are respectively generally indicated by the reference numerals 10A and 11A in FIGS. 2-4 wherein parts thereof that are similar to the system 10 and unit 11 are indicated by like reference numerals followed by the reference letter "A".

As illustrated in FIG. 2, the pressure source conduit 36A is still interconnected by the branch conduit 37A to the chamber 38A of the relay 14A as well as to the chamber 64A of the valve unit 18A by the branch conduit 65A.

However, the conduit 36A is interconnected by a single orifice 100 of this invention to the conduit 50A that leads from the inlet 21A of the switching device 17A to the pilot chamber 49A of the relay 14A.

In this manner, all of the pressure fluid that is directed to the chamber 49A of the relay 14A passes through the orifice 100 whether the conduit 50A is under the control of the temperature sensor 15A or under the control of the temperature sensor 16A as will be apparent hereinafter.

The outlet 68A of the valve unit 18A is interconnected by the conduit 69A to the chamber 79A of the reset means 19A as in the system 10.

However, instead of the orifice 77 of the prior art system 10, an orifice cup 101 is provided in the housing means 20A of the reset means 19A to be in communication with the chamber 79A to thereby interconnect the same to a vent opening 102 to bleed down the conduit 69A in the same manner that the orifice 77 performed for the system 10.

In addition, the reset means 19A of this invention does not include the valve means 82, 84 of the prior art unit 11, but in place thereof has a close-before-open valve means that is generally indicated by the reference numeral 103 in FIG. 2.

The close-before-open valve means 103 includes a fixed valve seat 104 of the housing means 20A that is adapted to be opened and closed by a flexible diaphragm 105 carried by the housing means 20A and normally moved to the closed position thereof by a compression spring 106 that is disposed in a chamber 107 formed in the housing means 20A.

A movable tubular valve seat member 108 is loosely disposed inside the fixed valve seat 104 and has one open end 109 thereof adapted to be engaged by the valve member 105 to close a passage 110 therethrough while the other open end 111 of the tubular valve member 108 is enlarged as illustrated and is adapted to engage against the diaphragm portion 84A of the diaphragm 78A as illustrated so as to sealingly interconnect the passage 110 of the tubular valve seat member 108 to an opening 112 in the diaphragm portion 84A which leads to a vent passage 113 that passes completely through the plunger 85A that is controlled by the end 88A of the reset fulcrum lever 86A as will be apparent hereinafter. The end 111 of the tubular valve seat member 108 is always maintained in sealing relation against the diaphragm portion 84A of the diaphragm 78A by a compression spring 114 disposed between the fixed valve seat 104 and the tubular valve member 108 as illustrated.

The diaphragm 105 of the close-before-open valve means 103 cooperates with the housing 20A to define another chamber 115 therewith that is disposed opposite to the chamber 107 and is adapted to lead to the valve seat 104 when the valve seat 104 is opened to interconnect with another chamber 116 of the housing means 20A that is interconnected to the conduit 35A.

In order to balance the fluid pressure forces that will act on the diaphragm 105, the diaphragm 105 has an offset opening 117 passing therethrough to always interconnect the chambers 107 and 115 together.

The chamber 115 of the close-before-open valve means 103 is interconnected by an internal passage means 118 of the housing means 20A to the chamber 79A of the reset means 19A for a purpose hereinafter described.

From the above, it can readily be seen that the system 10A and control unit 11A of this invention as illustrated in FIG. 2 is simplified over the system 10 and control unit 11 of the prior art illustrated in FIG. 1 because one of the orifices 57 and 74 thereof has been eliminated, the orifice 70 has been eliminated, and the valve means 82, 84 have been replaced by the close-before-open valve means 103 of this invention to permit the system 10A and control unit 11A to operate with a reduced maximum air consumption.

In particular, the operation of the control system 10A and control unit 11A of this invention will now be described.

When the pressure source (not shown in FIG. 2) is delivering its low level pressure into the conduit 36A for daytime operation, the valve member 66A of the device 18A maintains the valve seat 65A closed so that no pressure fluid is directed into the conduit 69A to be conveyed to the pressure chamber 34A of the switching device 17A in the manner hereinafter described.

Accordingly, the compression spring 33A of the switching device 17A maintains the valve member 30A against the valve seat 29A so that the valve seat 28A remains open to interconnect the conduits 50A and 26A together.

Thus, the low level pressure fluid from the conduit 36A passes through the single orifice 100 into the conduit 50A and, thus, into the pilot chamber 49A of the relay 14A at a controlled rate and with the pressure value thereof being determined by the temperature being sensed by the temperature sensor 15A in the same manner as the sensor 15 previously described.

However, when the conduit 36A is supplied the high pressure level of fluid from the pressure source (not shown), the device 18A has the valve seat 65A thereof opened so that the pressure fluid from the conduit 36A can flow into the chamber 79A of the reset means 19A.

The fluid pressure now being directed into the chamber 79A acts on the diaphragm portion 91A as illustrated in FIG. 3 to move the plunger 90A downwardly so that the lever 86A pivots in a clockwise direction on its pivot point 87A to raise the end 88A thereof. The raising of the end 88A of the lever 86A causes the plunger 85A to carry the diaphragm portion 84A upwardly therewith as well as the tubular valve seat member 108 and force the diaphragm 105 away from the fixed valve seat 104 in opposition to the force of the compression spring 106 and 114 as illustrated in FIG. 3.

The opening of the valve seat 104 by the high level pressure acting in the chamber 79A of reset means 19A interconnects the pressure source conduit 69A through the internal passage means 118 and now opened valve seat 104 to the chamber 116 and, thus, to the conduit 35A. The pressure fluid in the conduit 35A now acts in the chamber 34A of the switching valve means 17A to move the valve member 30A upwardly to close the valve seat 28A and open the valve seat 29A so that the sensor 15A is disconnected from the relay 17A and the sensor 16A is now interconnected thereto through the opened valve seat 29A.

Thus, the single orifice 100 still directs fluid pressure from the conduit 36A into the conduit 50A and, thus, to the pilot chamber 49A of the relay 14A but the pressure value thereof is now determined by the amount of bleed being produced by the sensor 16A in the same manner as the sensor 16 previously described.

Therefore, it can be seen that the system 10A and unit 11A of this invention is adapted to utilize the single orifice 100 for supplying the pressure fluid to the relay 14A regardless of which temperature sensor 15A or 16A is being utilized to control the relay 14A whereby one of the orifices 57 or 74 of the system 10A and unit 11A has been eliminated by this invention.

Further, when it is desired to reset the system 10A and the unit 11A from its nighttime operation by the reset lever 94A, the rotation of the lever 94A to cause the abutments 93A thereof to cam out of the openings 92A of the fulcrum lever 86A and cam against the end 89A thereof will cause the lever 86A to pivot in a counterclockwise direction as illustrated in FIG. 4, such downward movement of the end 88A of the lever 86A permitting the plunger 85A to move in unison therewith under the force of the compression springs 106 and 114.

However, such downward movement of the end 88A of the lever 86A causes the valve member 105 to first engage against the fixed valve seat 104 and close the same before the end 109 of the tubular valve member 108 moves further downwardly therefrom to open away from the valve member 105 in the manner illustrated in FIG. 4 and thereby interconnect the conduit 35A through the now opened end 109 of the tubular valve member 108 to the vent passage 113 through the plunger 85A.

Thus, with the reset lever 94A in the reset position illustrated in FIG. 4, the switching device 17A has the chamber 34A thereof interconnected to vent so that the compression spring 33A moves the valve member 30A downwardly to close the valve seat 29A and open the valve seat 28A whereby the temperature sensor 15A now controls the pressure value of the pressure fluid being directed to the pilot chamber 49A of the relay 14A even though the conduit 36A is supplying the source pressure at the high level thereof.

With the unit 11A now in the condition illustrated in FIG. 4, it can be seen that the high level pressure fluid being directed from the valving means 18A into the chamber 79A, continuously bleeds to the atmosphere through the orifice cup 101 at a controlled rate.

It has been found that by utilizing the close-before-open valve means 103 of this invention in the above manner, the maximum air consumption over the system 10 is reduced at 25 psi air supply to 1.5 S.C.F.H. whereas the system 10 of FIG. 1 has a maximum air consumption of 3.5 S.C.F.H. at 25 psi air supply.

When the reset lever 94A is manually returned back to the condition illustrated in FIG. 3, the end 88A of the lever 86A is adapted to move back upwardly under the downward movement of the diaphragm portion 91A to cause the end 109 of the tubular valve member 108 to move upwardly and close against the valve member 105 before the same moves the valve member 105 away from the valve seat 104 as illustrated so that the vent passage 113 is first closed from the chamber 116 before the valve member 105 opens the valve seat 104 to interconnect the pressure source to the chamber 116.

The opening of the valve seat 104 thus interconnects the pressure source to the conduit 35A to again cause the switching valve means 17A to switch to the sensor 16A in the manner previously described.

If desired, the conduits 71 and 71A of FIGS. 1 and 2 can be interconnected to other pneumatically operated devices (not shown) to control other desired nighttime operations.

Therefore, it can be seen that this invention not only provides an improved two-temperature pneumatic thermostat control system, but also this invention provides an improved two-temperature pneumatic thermostat control unit for such a system or the like.

While the form of the invention now preferred has been illustrated and described as required by the Patent Statute, it is to be understood that other forms can be utilized and still fall within the scope of the appended claims.

What is claimed is:

1. In a two-temperature pneumatic thermostat control system having an output device, a two level source of pneumatic pressure, a first temperature sensor for controlling the flow of pneumatic fluid from said source to said device when said source is at a first level thereof, a second temperature sensor for controlling the flow of pneumatic fluid from said source to said device when said source is at a second level thereof, a switching means for automatically switching said device to be controlled by said first sensor when said source is at said first level thereof and by said second sensor when said source is at said second level thereof, and manual reset means for causing said switching means to switch said device to be controlled by said first sensor even though said source is at said second level thereof when said reset means is moved to a reset position thereof, said reset means including a pivotally mounted lever having pneumatic means for acting on one end thereof and valve means at the other end thereof to be controlled thereby, the improvement wherein said valve means comprises a close-before-open valve means operatively interconnected to said inlet means and said switching means to be controlled by said other end of said lever of said reset means to cause said switching means to switch said device to be controlled by said first sensor even though said source is at said second level thereof when said reset means is moved to said reset position thereof.

2. A system as set forth in claim 1 wherein said close-before-open valve means is adapted to interconnect said source at said second level thereof to said switching means to cause said switching means to switch said device to be controlled by said second sensor.

3. A system as set forth in claim 2 wherein said close-before-open valve means has first means adapted to interconnect said switching means to vent when said reset means is moved to said reset position thereof.

4. A system as set forth in claim 3 wherein said close-before-open valve means has second means for closing said source from said switching means before said first means can interconnect said switching means to said vent.

5. A system as set forth in claim 4 wherein said second means of said close-before-open valve means comprises a fixed valve seat and a movable valve member for opening and closing said fixed valve seat, said first means of said close-before-open valve means comprising a movable valve seat disposed inside said fixed valve seat and being adapted to be opened and closed by said movable valve member.

6. In a two-temperature pneumatic thermostat control unit having an output device, a first temperature sensor for controlling the flow of pneumatic fluid from a two level source of pneumatic pressure to said device when said source is at a first level thereof, a second temperature sensor for controlling the flow of pneumatic fluid from said source to said device when said source is at a second level thereof, a switching means for automatically switching said device to be controlled by said first sensor when said source is at said first level thereof and by said second sensor when said source is at said second level thereof, and manual reset means for causing said switching means to switch said device to be controlled by said first sensor even though said source is at said second level thereof when said reset means is moved to a reset position thereof, said reset means including a pivotally mounted lever having pneumatic means for acting on one end thereof and valve means at the other end thereof to be controlled thereby, the improvement wherein said valve means comprises a close-before-open valve means operatively interconnected to said inlet means and said switching means to be controlled by said other end of said lever of said reset means to cause said switching means to switch said device to be controlled by said first sensor even though said source is at said second level thereof when said reset means is moved to said reset position thereof.

7. A control unit as set forth in claim 6 wherein said close-before-open valve means is adapted to interconnect said source at said second level thereof to said switching means to cause said switching means to switch said device to be controlled by said second sensor.

8. A control unit as set forth in claim 7 wherein said close-before-open valve means has first means adapted to interconnect said switching means to vent when said reset means is moved to said reset position thereof.

9. A control unit as set forth in claim 8 wherein said close-before-open valve means has second means for closing said source from said switching means before said first means can interconnect said switching means to said vent.

10. A control unit as set forth in claim 9 wherein said second means of said close-before-open valve means comprises a fixed valve seat and a movable valve member for opening and closing said fixed valve seat, said first means of said close-before-open valve means comprising a movable valve seat disposed inside said fixed valve seat and being adapted to be opened and closed by said movable valve members.

* * * * *